Nov. 20, 1928.

M. J. J. RIGOLAGE 1,692,703

CONSTRUCTION OF AUTOMATIC CLUTCHES PROVIDED WITH A CENTRIFUGAL MASS

Filed Oct. 13, 1924　　2 Sheets-Sheet 1

Nov. 20, 1928.  
M. J. J. RIGOLAGE  
1,692,703  
CONSTRUCTION OF AUTOMATIC CLUTCHES PROVIDED WITH A CENTRIFUGAL MASS  
Filed Oct. 13, 1924  
2 Sheets-Sheet 2
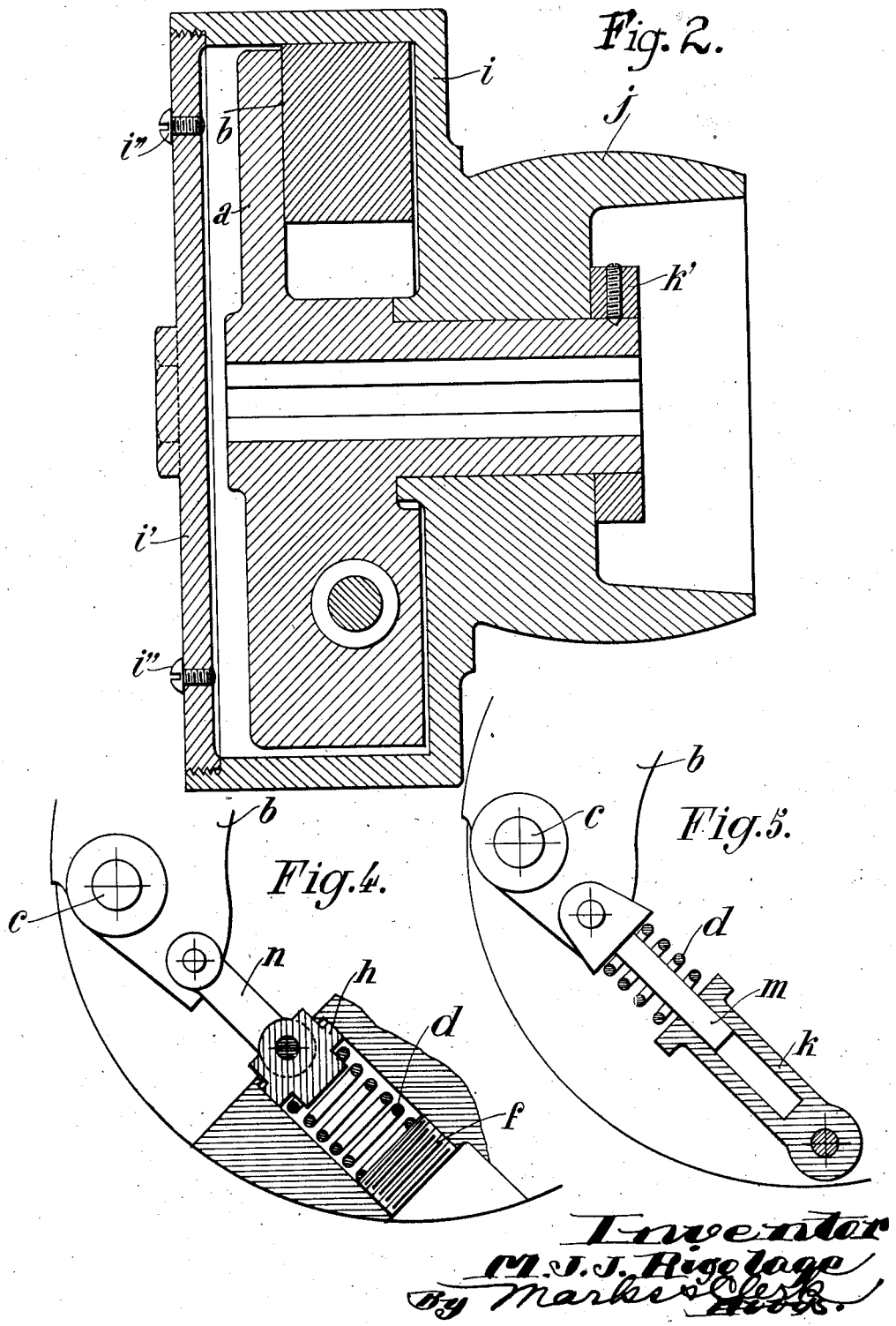

Patented Nov. 20, 1928.

1,692,703

UNITED STATES PATENT OFFICE.

MAURICE JEAN JOSEPH RIGOLAGE, OF PARIS, FRANCE, ASSIGNOR TO SOCIÉTÉ D'EUGINS GRAISSEURS, OF PARIS, FRANCE.

CONSTRUCTION OF AUTOMATIC CLUTCHES PROVIDED WITH A CENTRIFUGAL MASS.

Application filed October 13, 1924, Serial No. 743,426, and in France October 24, 1923.

The present invention has for its object improvements in the construction of automatic clutches in which the coupling between the driving and driven shafts is effected by the displacements, under the action of centrifugal force, of rocking masses subjected to the opposing stress of resilient devices. These improvements are essentially characterized in that the connections existing between the rocking masses and the corresponding resilient devices are such that, when the said masses are disposed in driving relation to the driven mechanism the resilient devices no longer act to displace the rocking masses and, consequently, offer no opposition to the angular displacement of the rocking mass by centrifugal force.

In the accompanying drawing and by way of example:

Figs. 1 and 2 are respectively an elevation partly in section and a cross section of a form of construction of the improvements forming the subject-matter of the present invention.

Figs. 3, 4, 5 are partial views of other constructional modifications.

Essentially, the clutch is composed of a circular plate $a$ on which is secured a mass $b$ movable about an axis or pivot $c$ riveted on the plate $a$.

A high tension spring $d$ confined in a passage in the counterweight $e$ of the plate $a$ by a screw $f$, acts on the cam shaped heel piece $g$ on the mass $b$ and prevents displacement of the latter to clutching position at low speeds.

Figure 1:
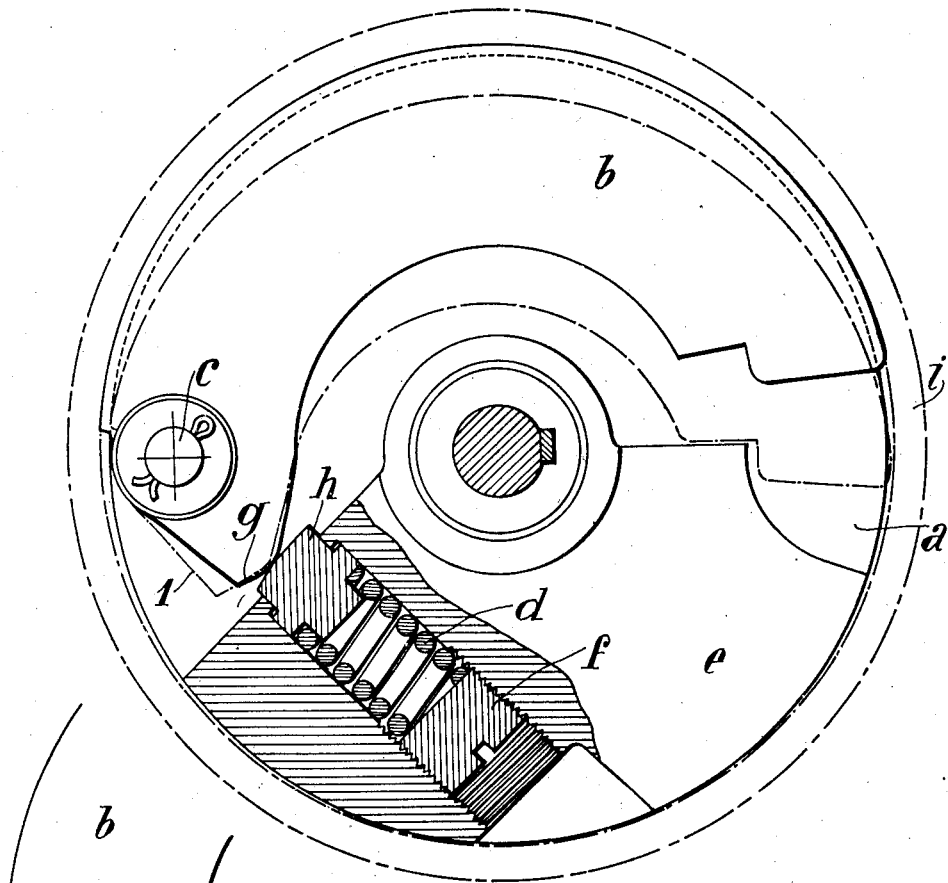

In the form of construction of Fig. 1, a thrust piece $h$ terminated by an inclined face transmits to the heel piece $g$ the stress of the spring $d$.

The plate $a$ is keyed on the driving shaft.

A pulley-fly-wheel $i$ freely rotates on the hub of the plate $a$ and carries a pulley $j$ on which will be mounted the belt driving the apparatus to be actuated.

A washer $k'$ holds the pulley $j$ in place.

Under the influence of centrifugal force, the mass $b$ moves away from the position of rest $l$ so as to engage, at the desired speed, on the inner wall of the pulley $i$.

At this moment, the oil which bathes the walls of the clutch is forced away by the metallic surfaces in contact and, after a slight sliding movement, a driving connection is established.

The apparatus is so adjusted that actual clutching takes place at the time the engine has reached its working speed.

It is to be noted that in this position the point of contact between the cam $g$ and the thrust piece $h$ is substantially in line with the spring $d$ and the pivot $c$. The spring $d$ is therefore, at this moment practically incapable of effecting displacement of the mass of engagement $b$.

Figure 3:
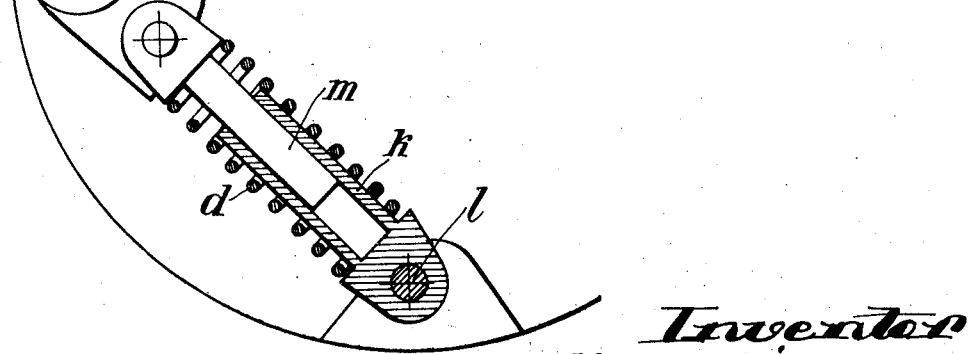

In the modification, Fig. 3, the spring $d$ is guided by a socket $k$ which can pivot on the axis $l$ carried by the plate $a$. In this socket $k$ slides a plunger $m$ which is pivoted on the rocking mass $b$. The ends of the spring $d$ bear respectively on the heads of the telescoping socket $k$ and plunger $m$.

In the modification, Fig. 4, the spring $d$ is arranged as in the form of construction of Figs. 1, 2, but the push piece $h$, instead of directly engaging with a cam $g$ which is formed on the rocking mass $b$, is connected by a link $n$ pivoted, on the one hand, on the latter, and on the other hand on the push piece $h$.

In the modification Fig. 5, the connection between the rocking mass $b$ and the plate $a$ driving it in rotation, is obtained by means of two telescopic members one of which is constituted by a socket $k$ pivoted on the plate $a$ and the other, by a plunger $m$ pivoted to the rocking mass $b$. The spring $d$ is interposed between the head of the plunger $m$ and the corresponding end of the socket $k$ which acts as a guide for the same.

These various modifications provide the same result as the arrangement of Figs. 1-2.

In the case of direct coupling, the pulley-fly-wheel is keyed on the shaft to be driven.

For employing the pulley $i$ as an oil casing in which are enclosed the plate $a$ and the centrifugal mass with the resilient devices, this pulley $i$ can be provided with a screw threaded plug $i'$ provided with openings receiving screws $i''$ in order to permit introducing oil therein.

What I claim as my invention and desire to secure by Letters Patent is:

1. In an automatic clutch, a drive plate, a drum loosely mounted with respect to the plate, and constituting an oil-tight casing enclosing the plate, a clutch shoe pivoted to the plate, said plate having a passage therein, a thrust member guided in said passage, an adjustable stop member in said passage, a coil spring located in the passage intermediate the stop and thrust members, an inclined face on the thrust member, said clutch shoe having an inclined face corresponding with the inclined face of the thrust member, the respective profiles of said inclined faces being formed in such manner that when said shoe has entered into contact with the drum to effect clutching the point of contact between them is moved into line with the axis of the shoe and the axis of movement of the thrust member.

2. In an automatic clutch, a driving plate, a drum rotatably mounted with respect to the plate, a centrifugally actuated clutch member pivoted to said plate, a spring on said plate, and actuating means between the spring and the clutch member, said spring normally tending to move the clutch member in a direction opposite to that in which it is urged by centrifugal force, said actuating means acting, when the clutch shoe is fully engaged with the drum, to render the spring ineffective.

In testimony whereof I have signed my name to this specification.

MAURICE JEAN JOSEPH RIGOLAGE.